Nov. 29, 1955  E. G. SMITH ET AL  2,725,144

FILTER ELEMENT

Filed May 14, 1953  3 Sheets-Sheet 1

Inventors
EDMUND G. SMITH
OTELL M. COCCHIARELLA

By

Attorney

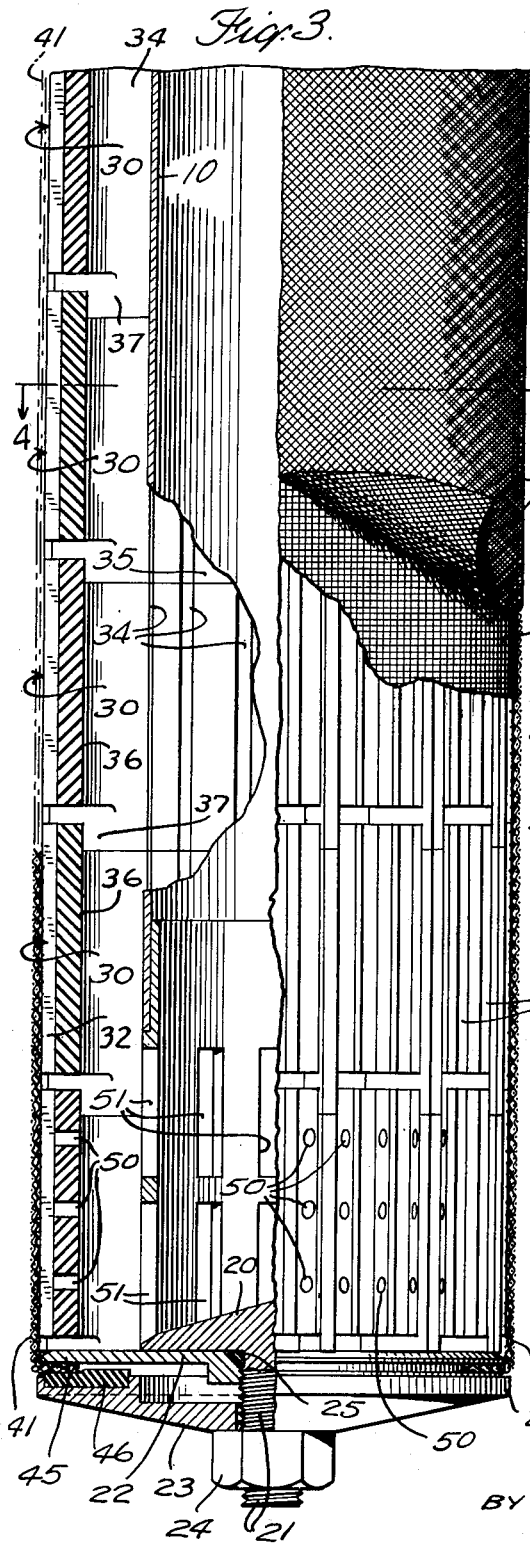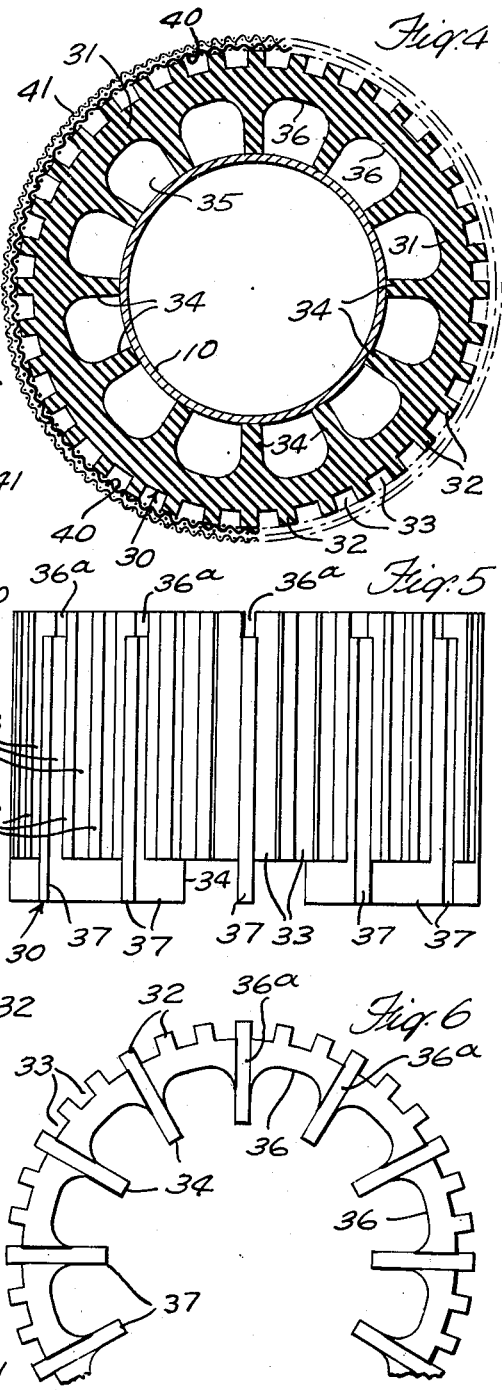

Nov. 29, 1955  E. G. SMITH ET AL  2,725,144

FILTER ELEMENT

Filed May 14, 1953  3 Sheets-Sheet 3

Inventors
EDMUND G. SMITH
OTELL M. COCCHIARELLA

By
Attorney

United States Patent Office 2,725,144
Patented Nov. 29, 1955

2,725,144

FILTER ELEMENT

Edmund G. Smith, Cedar Grove, and Otell M. Cocchiarella, Verona, N. J., assignors to Equipment Development Co., Inc., Montclair, N. J., a corporation of New Jersey Application May 14, 1953, Serial No. 354,992

1 Claim. (Cl. 210—170)

This invention relates to filter elements and more particularly to a filter tube assembly having improved spacing and supporting means for a filter cloth.

An object of the invention is to provide a novel and improved spacing and supporting means which facilitates the assembly of the apparatus and provides the required passages for the flow of liquid through the filter cloth and into the tube, as well as for the flow of return liquid for removing the filter cake from the cloth.

Another object is to provide a spacer construction which is readily assembled, is suited to filtration and thickening equipment having varied characteristics and is unaffected by hot liquids or corrosive liquids.

Various other objects and advantages will be apparent as the nature of the invention is more fully disclosed.

The invention will be better understood from the following description, taken in connection with the accompanying drawings in which certain specific embodiments thereof have been set forth for purposes of illustration.

In the drawings:

Fig. 3 is a partial vertical section, taken on the line 3—3 of Fig. 1, but on a larger scale;

Fig. 4 is a transverse section, taken on the line 4—4 of Figs. 1 and 3 showing the construction of the spacer;

Fig. 5 is a side elevation of the spacer;

Fig. 6 is a top plan view thereof;

Figure 1:
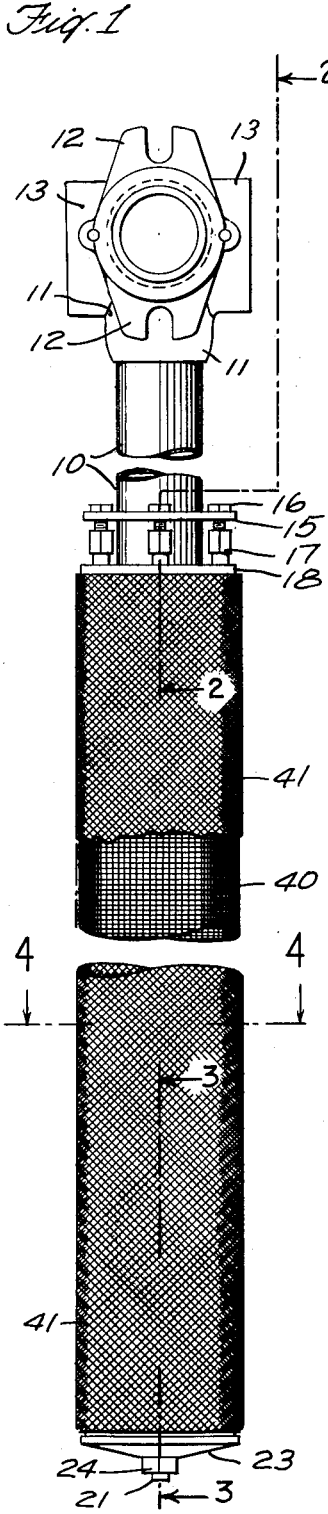
Fig. 1 is a broken side elevation of a filter tube embodying the invention.

Referring to the drawings more in detail, the invention is shown as applied to a thickening tube of the type shown in our Patent No. 2,578,636, dated December 11, 1951, wherein a plurality of thickener tubes carrying filter cloths are suspended from a header into the liquid to be thickened and are oscillated laterally during the thickening operation so as to facilitate the discharge of the filter cake from the cloth. The thickening cycle includes a filtering period when suction is applied to the tube to draw filtrate through the cloth and into the header, followed by a "blow back" period when the flow of filtrate is reversed suddenly and for a short time only to dislodge the filter cake from the cloth and thus prevent the cloth from clogging and reducing the filtering efficiency.

In accordance with the present invention, a tube 10 is carried in an elbow housing 11 having flanges 12 for attachment to a header of the type shown in said Patent No. 2,578,636 and with sight glasses 13.

The tube 10 carries near its upper end a ring 15 carrying clamping screws 16 onto which clamping nuts 17 are threaded. The nuts 17 engage a clamping ring 18 cooperating with a fixed ring 19 which may be welded to the tube 10.

At its lower end (Fig. 3), the tube 10 carries a plug 20 which is welded thereto and has an axial threaded stud 21 projecting downwardly beyond the end of the tube 10. A plate 22 is threaded onto the stud 21 and is held tightly against the bottom of the tube 10 to form a closure. A sealing ring 25 of rubber or the like prevents leakage around the stud 21. A clamping plate 23 is secured below the plate 22 by a nut 24 on the stud 21.

A plurality of ring spacers 30 (Figs. 4, 5, 6 and 8) made of a molded material, such as rubber or a synthetic plastic which is non-corrosive to the liquids to be filtered, are disposed about the tube 10 between the top ring 19 and the bottom plate 22. Each ring spacer 30 comprises an annular peripheral wall 31 having a plurality of axial ribs 32 on the outside forming channels 33 therebetween, and a plurality of internal radial ribs 34 shaped to engage the outer surface of the tube 10 and forming longitudinal channels 35 therebetween. The inner surface of the wall 31 is arched as at 36 between the internal ribs 34 so as to support the wall 31 against the pressure of the liquid on the outside of the tube.

The top surface of each spacer 30 is provided with radial grooves 36a in alignment with certain of the ribs 32 and radial flanges 37 project from the under surface of the spacer to register with the grooves 36a for positioning a stack of spacers 30 relative to each other with the channels 33 and 35 of the stack in alignment. The flanges 37 are longer than the grooves 36a so that an annular space is provided between successive spacers in the stack.

In assembling the spacers the stack is pushed up around the tube 10 from the bottom into engagement with the ring 19, the gasket 25 is placed around the stud 21, and the bottom plate 22 is screwed into place to support the stack.

An under screen 40, such as woven Saran or other synthetic plastic, is wrapped around the spacers in a single layer with a short overlap at the meeting longitudinal edges and is secured by "spot welding" the overlapped edges as by application of sufficient heat to soften the thermoplastic material and cause the same to adhere together. A continuous sleeve is thus formed which extends beyond the plates 19 and 22 at the top and bottom respectively and is tightly drawn around the spacers 30.

A filter cloth 41 preformed into a sleeve with a narrow side seam and made from a fabric of the type disclosed in Patent No. 2,551,175 dated May 1, 1951, is now drawn into place over the underscreen 40 with ends also overlapping the plates 19 and 22.

Figure 2:
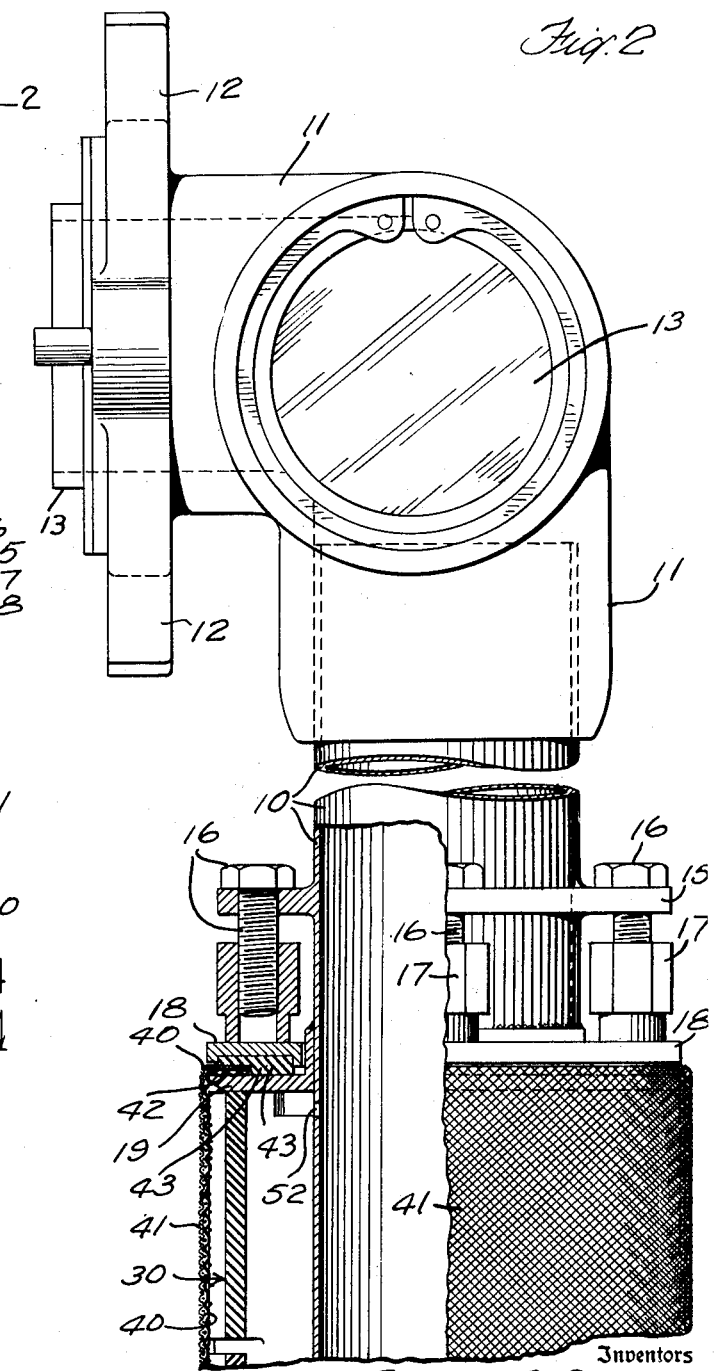
Fig. 2 is a partial vertical section taken on the line 2—2 of Fig. 1, but on a larger scale.

The upper end of the underscreen 40 and sleeve 41 is folded inwardly in a top flange 42 above the plate 19 and is clamped by a soft gasket 43 of rubber or synthetic compressible material which is held in an annular groove in the underside of the clamping plate 18 (Fig. 2). Screws 16 exert clamping pressure to form a tight seal around its entire periphery.

At the lower end the screen 40 and cloth 41 are folded below the plate 22 in a flange 45 which fits in a groove in a gasket 46 of rubber or synthetic compressible material held in an annular groove in the clamping plate 23. The flange 45 is tightly clamped between the gasket 46 and the plate 22 by the nut 24 to form a seal around the entire periphery of the tube 10.

The lower spacer ring or rings 30 are formed with holes 50 to increase the flow of liquid and the lower end of the tube 10 is formed with holes 51 through which the filtrate flows to the interior of the tube. A vent hole 52 is formed near the top of the tube 10 to provide an air lock from forming in the spacer channels and interfering with the return flow of liquid for the purpose specified.

The space between ring sections 30 is such that the resistance to liquid flow is greater than along the channels 35, the purpose being to equalize the flow along the channels. The filtrate flows through the cloth 41 and screen 40 into the channels 33, thence between the ring sections 30 into the larger channels 35, thence downwardly and through the holes 51 into the interior of the tube 10 whence it is drawn upwardly by the suction in the header. On reverse flow the liquid flows outwardly through the holes 51 and produces pressure against the inside of the filter cloth 41 for discharging the filter cake as described in said Patent No. 2,578,636. The holes 51, channels 33 and 35 and the spacing between sections 30 is such that a rate of return flow in excess of the average rate of liquid removal during the filtering period can be obtained without excessive head of liquid which would tend to tear the cloth.

The cloth 41 can be removed and replaced when necessary by loosening the nut 24 at the bottom and the screws 16 at the top to relieve the pressure on the clamping plates 22 and 16. The cloth 41 can ordinarily be removed without disturbing the underscreen 40 which serves as a support therefor.

Figure 7:
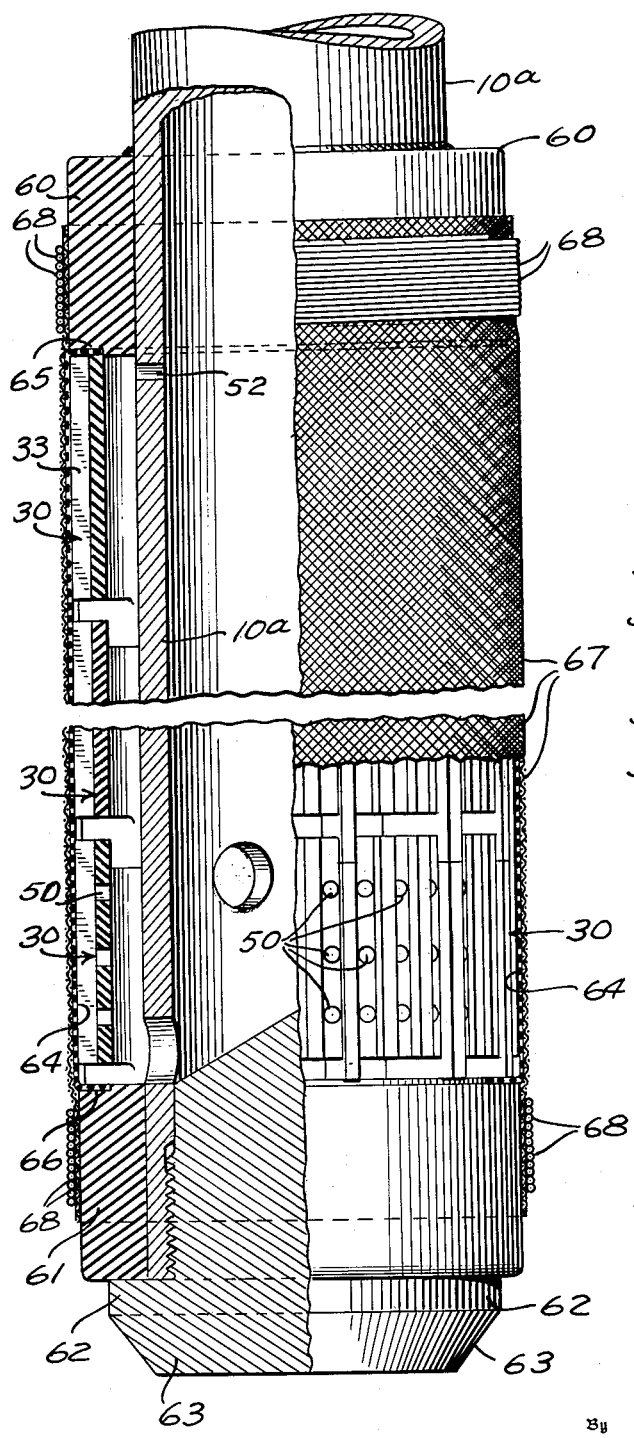
Fig. 7 is a broken vertical section illustrating another embodiment of the invention.
Figure 8:
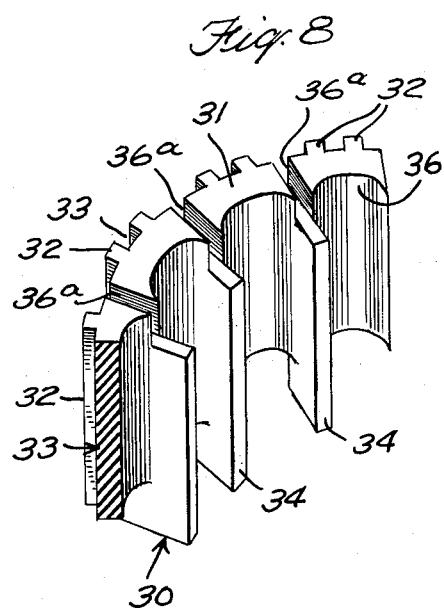
Fig. 8 is a fragmentary perspective view of the spacer.

The embodiment shown in Figs. 1 to 3 is suited for use with metal tubes. For use with tubes made of synthetic plastic material, for example, for treating acids or other corrosive liquids, the filter cloth and spacers may be supported as in Fig. 7. In this form the tube 10a is similar to the tube 10 of Figs. 1 to 3, but is made of a plastic material. The spacers 30 are the same as previously described, but are held between a fixed ring 60 of rubber or the like which may be cemented or otherwise secured about the tube 10a at the top, and a similar ring 61 at the bottom which is held in place by a flange 62 of a plug 63 threaded into the tube 10a and forming a bottom closure therefor.

The underscreen 64, which is similar to the underscreen 40 of Figs. 1 to 3 has its top flange 65 folded in a recess in the top ring 60, between the ring 60 and the upper spacer 30, and has its bottom flange 66 folded in a recess in the ring 61, between the ring 61 and the bottom spacer 30 so as to form top and bottom seals and to hold the screen 64 in place. The outer sleeve of filter cloth 67, which is similar to the filter cloth 41 of Figs. 1 to 3, extends over the outer peripheries of the rings 60 and 61 and is secured by a wrapped cord 68 of plastic material, such as nylon, Saran or the like, which may be cemented if necessary.

In this form, the filter cloth 67 is removable by unwrapping the cords 68 and sliding the cloth sleeve from the tube, leaving the screen 64 and other elements in place.

This method of fastening the cloth sleeve may, of course, be used with metal tubes if desired. Also, in the embodiment of Figs. 1 to 3 the screen 40 can be clamped between the top plate 19 and the top spacer ring 30, and between the plate 22 and the bottom spacer ring 30 if desired so that it remains secured when the filter cloth 41 is removed by loosening the clamping ring 15 and the clamping plate 23.

Obviously, the spacers 30 may all be formed with holes 50 for the flow of liquid into the inner channels 55 if additional passages are required.

The spacers 30, as herein described, provide for a uniform flow of filtrate to and from the entire area of the filter cloth 41 as is necessary for obtaining the maximum filtration efficiency. The channels 35 should have a capacity in excess of that of the channels 33 and equal to the capacity of the tube 10 so that the flow through the cloth 41 and the reverse flow from the tube 10 is unimpeded thereby.

Although specific embodiments have been shown for purposes of illustration, it is to be understood that adaptations may be made therein as will be apparent to a person skilled in the art.

What is claimed is:

In a filter having a tube to receive filtrate and a filter cloth disposed around said tube, spacers disposed around said tubes to support said cloth in spaced relationship therefrom, said spacers comprising a plurality of annular rubberlike members disposed in a stack around said tube, each member having a cylindrical peripheral surface, inwardly extending radial fins spacing said peripheral surface from said tube and forming with said peripheral surface a plurality of inner longitudinal channels spaced around said tube, and outwardly extending radial fins supporting said filter cloth and forming with said cylindrical wall outer longitudinal channels spaced around said cylindrical wall, said sections having end surfaces formed respectively with interlocking flanges and grooves spacing said sections apart to form communicating liquid passages between said inner and outer channels.

References Cited in the file of this patent

UNITED STATES PATENTS

| | | |
|---|---|---|
| 746,378 | Redfield | Dec. 8, 1903 |
| 1,663,298 | Geer et al. | Mar. 20, 1928 |
| 1,705,848 | Austin | Mar. 19, 1929 |
| 2,057,814 | Barrett | Oct. 20, 1936 |
| 2,600,150 | Abendroth | June 10, 1952 |